United States Patent [19]

Sperti

[11] Patent Number: 5,230,150
[45] Date of Patent: Jul. 27, 1993

[54] TUBING CUTTER APPLYING CONTINUOUS CUTTING FORCE TO TUBING

[76] Inventor: Vincent R. Sperti, 2502 Arslan St., Deltona, Fla. 32738

[21] Appl. No.: 879,896

[22] Filed: May 8, 1992

[51] Int. Cl.$^5$ .......................... B32D 21/08; B26D 3/16
[52] U.S. Cl. .......................................... 30/101; 30/94; 30/102
[58] Field of Search ...................... 30/101, 102, 93, 94, 30/95, 96; 82/46, 70.1, 70.2; 72/71

[56] References Cited

U.S. PATENT DOCUMENTS

| | | | |
|---|---|---|---|
| 197,658 | 11/1877 | Ochsner | 30/94 |
| 1,107,511 | 8/1914 | Gallagher et al. | 30/102 |
| 1,702,801 | 2/1929 | Smith | 30/94 |
| 1,945,949 | 2/1934 | Myers | 30/102 |
| 2,058,072 | 10/1936 | Fiddyment | 30/120.3 |
| 2,447,371 | 8/1948 | Sipsma et al. | 30/102 |
| 2,631,411 | 3/1953 | Pierson | 30/102 |
| 2,743,520 | 5/1956 | Hofmaster | 30/102 |
| 3,672,050 | 6/1972 | Hanback | 30/101 |
| 3,715,804 | 2/1973 | Kelley | 30/102 |
| 4,305,205 | 12/1981 | Girala | 30/102 |

FOREIGN PATENT DOCUMENTS

| | | |
|---|---|---|
| 775897 | 1/1935 | France . |
| 20142 | of 1913 | United Kingdom . |
| 8900904 | 2/1989 | World Int. Prop. O. .......... 30/101 |

*Primary Examiner*—Frank T. Yost
*Assistant Examiner*—Hwei-Siu Payer
*Attorney, Agent, or Firm*—Julian C. Renfro

[57] ABSTRACT

A tubing cutter comprising a pair of arms pivotally connected together adjacent one end, with the opposite ends of the arms free. Such opposite end of one of the arms has thereon a rotatably mounted cutting wheel, and upon the opposite end of the other of the arms at least one roller is utilized, in opposed operative relationship to the cutting wheel. A tightening arrangement, preferably in the form of a finger operated wheel mounted on a dually threaded shaft, is utilized for enabling the user to draw the free ends of the arms together, so as to force the cutting wheel into cutting contact with a piece of tubing placed between the rotary cutter and the rollers. Thus, upon relative rotation occurring between the cutting wheel and the tubing, the severing of the tubing can be readily brought about. Preferably a spring bias arrangement is utilized, which serves to assist the tube severing procedure by biasing the cutting wheel into firm contact with the tubing to be cut. In the primary embodiment of the invention, at least one laterally elongate slot is utilized at the location of the pivotal connection of the arms, to permit a controlled amount of laterally outward motion of the ends at the time of commencement of a tube cutting procedure. During this outward movement, potential energy is stored in the spring, which energy is subsequently utilized in a highly effective manner during the tube cutting procedure.

13 Claims, 3 Drawing Sheets

TUBING CUTTER APPLYING CONTINUOUS CUTTING FORCE TO TUBING

BACKGROUND OF THE INVENTION

Small, hand held tubing cutters have been in wide use for many years for severing certain pipes as well as metal, plastic and glass tubing, in each instance to a specific length. One early patent was that of Gallagher and Grimes, U.S. Pat. No. 1,107,511 and entitled "Pipe Cutting Appliance," which issued Aug. 18, 1914. This device was particularly designed for severing vertically disposed pipes located somewhat below ground level. Accordingly, this device utilized a pair of rotary cutters disposed at the lower ends of a pair of pivotally mounted legs, with these legs being of elongate configuration so as to extend down into a hole in the ground in which the pipe to be cut was located.

By forcing the pair of legs together, the rotary cutters could be brought into firm contact with the pipe to be cut. Although the Gallagher and Grimes patent was apparently satisfactory for the intended purpose, it was limited in its use in that it could only be attached to an open ended pipe or tubing. Also, it was not well suited for severing tubing of comparatively small diameter, particularly if the tubing was being held in the hand.

A device much more appropriate for cutting small tubing to a precise length was taught in the Myers U.S. Pat. No. 1,945,949 entitled "Tube Cutter." This device was constructed to utilize a closely spaced pair of rollers disposed in a generally opposed relationship to a cutting wheel, with the tubing to be cut placed therebetween. A spring biased threaded screw arrangement provided with a knurled tightening knob made it possible for a user to cause the cutting wheel to make successively deeper circumferential cuts until the tubing is finally severed. Devices of this type were usable in a highly advantageous manner in the field, because they were of such small size that they could be carried in the craftsman's pocket.

Importantly, Myers utilizes a single threaded shaft, which does not manipulate the components as rapidly as does a dual threaded shaft, and in addition, Myers introduces a clutch mechanism to his tubing cutter. As is obvious, the addition of the clutch members significantly increases the cost of manufacture of the Myers device.

Another device of the prior art was the Pierson U.S. Pat. No. 2,631,411, which was specifically designed for cutting glass tubing, with the Pierson device utilizing a pair of levers of similar length, which are pivotally secured together at one end. A rotary cutting wheel was disposed at the opposite end of the Pierson device, with a finger operated tightening knob operatively disposed on a single threaded rod being utilized at an intermediate location for bringing the two levers tightly together at the time the user wished to sever glass tubing. However, the Pierson patent utilized a spring means tending to bias the levers apart, which meant that the spring means was in a sense at cross purposes with the tightening means. In addition, the single threaded shaft 23 of Pierson often extended for a significant distance beyond all other components of the device, thus inviting possible damage as well as requiring additional storage space.

Still another pertinent device of the prior art was the Hofmaster U.S. Pat. No. 2,743,520, which device was described by the patentee as being of "plier-like configuration." The Hofmaster patent utilizes a tightening means located between the pivot point and the location where his cutting wheel is operatively disposed in conjunction with a roller means. As a consequence of this arrangement, the user needed to continue to apply a tightening effort to the tightening means, to cause the cutting wheel to eventually sever the tubing at the selected location.

When the user desired to utilize the Hofmaster device in cutting a rod or the like, the jaws 15 and 24 are spread apart by appropriate movement of bolt 33, to permit an insertion of the rod 14 between the cutting roller 20 and the pressure rollers 30. As illustrated in FIG. 1 of Hofmaster, the rollers are axially parallel with the axis of the rod 14, so the full length of the pressure rollers 30 are in contact with the rod. However, it is important to note that the radial arc generated by jaw 24 when adjusting this cutting device to rods of other diameters will cause the rollers 30 to no longer be axially parallel with the rod 14, and as a consequence, only the outer edges of the rollers 30 will be in contact with the rod. Also, the full length of this cutting device must lie parallel to a pipe during the cutting procedure or else it may be impossible to deal with obstructions such as bends in the pipe or couplings in the pipe that are in a close relationship to the location where the severing is to take place.

It was in an effort to overcome the disadvantages of these and other such patents that the present invention was evolved.

SUMMARY OF THE INVENTION

In accordance with this invention, I utilize a tubing cutter having first and second elongate arms, which may also be called radial arms. These arms are of a similar length, disposed in an adjacent relationship, and held together in a pivotally connected manner by a pin extending through both arms, at a location adjacent one end of each arm. This one end of each arm, also known as the hub end, contains an elongate, pin-receiving hole, such that during the cutting of tubing, the hub end of the first arm is enabled to move laterally, against as spring bias, for a limited extent relative to the hub end of the second arm.

The first arm utilizes a roller at the end remote from the hub end, whereas the second arm utilizes a cutting wheel at the end remote from its hub, which cutting wheel has a sharpened peripheral edge, and is mounted for rotative movement. Tightening means utilizing a double threaded shaft are utilized at a location intermediate the ends of the arms, enabling the arms to be moved together or apart in a selective manner. As a result of appropriate manipulation of the tightening means, the rotary cutting wheel of the second arm can be caused to bring about a highly effective severing of a piece of tubing placed between the cutting wheel and the roller means mounted adjacent the end of the first arm.

In a preferred embodiment, I utilize a spring means of generally circular configuration, with the ends of the spring means being spaced slightly apart instead residing in touching relation. The ends of the circular spring means are particularly configured so that upon the spring being installed across the hub ends of the arm, in a manner separately contacting each arm, the spring exerts a force tending to aid the cutting effort, instead of opposing the cutting effort, as was typical of the spring effort involved in many prior art tubing cutters.

Instead of the first ends of the arms each being equipped to tightly receive the pin, the elongate hole provided at the first or hub end of at least one arm permits the hub ends to move laterally past each other at such time as the tightening means is continued to be manipulated after causing the cutting wheel to move into firm contact with the tubing to be cut. Importantly, the circular spring is utilized so as to resist this movement apart of the hub ends of the arms, and as a result, a significant spring force is built up during the rotation of the tightening means. This amounts to a bias tending to cause the hub ends to move back into an aligned relationship. Advantageously, this spring force is transmitted to the cutting wheel, to bring about the application of continuous pressure of the sharpened edge of the cutting wheel against the tubing to be cut, necessitating only the application of relative rotation in order to bring about severing of the tubing.

As should now be clear, the circular spring I utilize serves to apply force to the first or hub ends of the two arms at such time as the screw threaded tightening means has been rotated to an extent sufficient to force the cutting wheel into firm contact with the tubing to be cut. The continuing force applied by the circular spring is such that the cutting wheel will be maintained in continuous firm contact with the tubing to be severed, and this in turn means that the user needs only to bring about relative rotation between the cutting wheel and the tubing to be cut, in order to accomplish a severing of the tube.

It is therefore a principal object of this invention to provide a relatively small, low cost tubing cutter that is characterized by its effectivity as well as the user being able to conduct all manipulations of the cutter with one hand.

It is a more detailed object of this invention to provide a hand held tubing cutter equipped with a spring arrangement that on occasion will apply a substantially constant cutting force to a cutting wheel, such that tubing will be severed at a desired location, merely by the user causing relative rotation between the cutting wheel and the tubing to be cut.

It is another object of this invention to provide a small, single adjustment tubing cutter utilizing a spring bias applied in an unobvious way, such that the cutting operation will be assisted, rather than the spring bias serving to oppose the cutting force applied to the cutting wheel.

It is yet another object of this invention to provide a small tubing cutter utilizing a tightening means enabling the user to provide a selected force to the cutting wheel, with this tightening means involving a tightening wheel mounted on a dually threaded shaft, such making possible a minimal amount of manipulation of the tightening wheel during the cutting of tubing.

It is yet still another object of this invention to provide a compact, single adjustment tubing cutter that can be utilized on curved sections of pipe, or at locations close to a coupling in the pipe.

It is still another object of this invention to provide a low cost tubing cutter configured such that both pieces of tubing advantageously stay attached to the tubing cutter, even after the severing of the tubing.

These and other objects, features and advantages will become more apparent from a study of the appended drawings and the descriptive material associated therewith.

DETAILED DESCRIPTION

Figures 1, 2, 3:
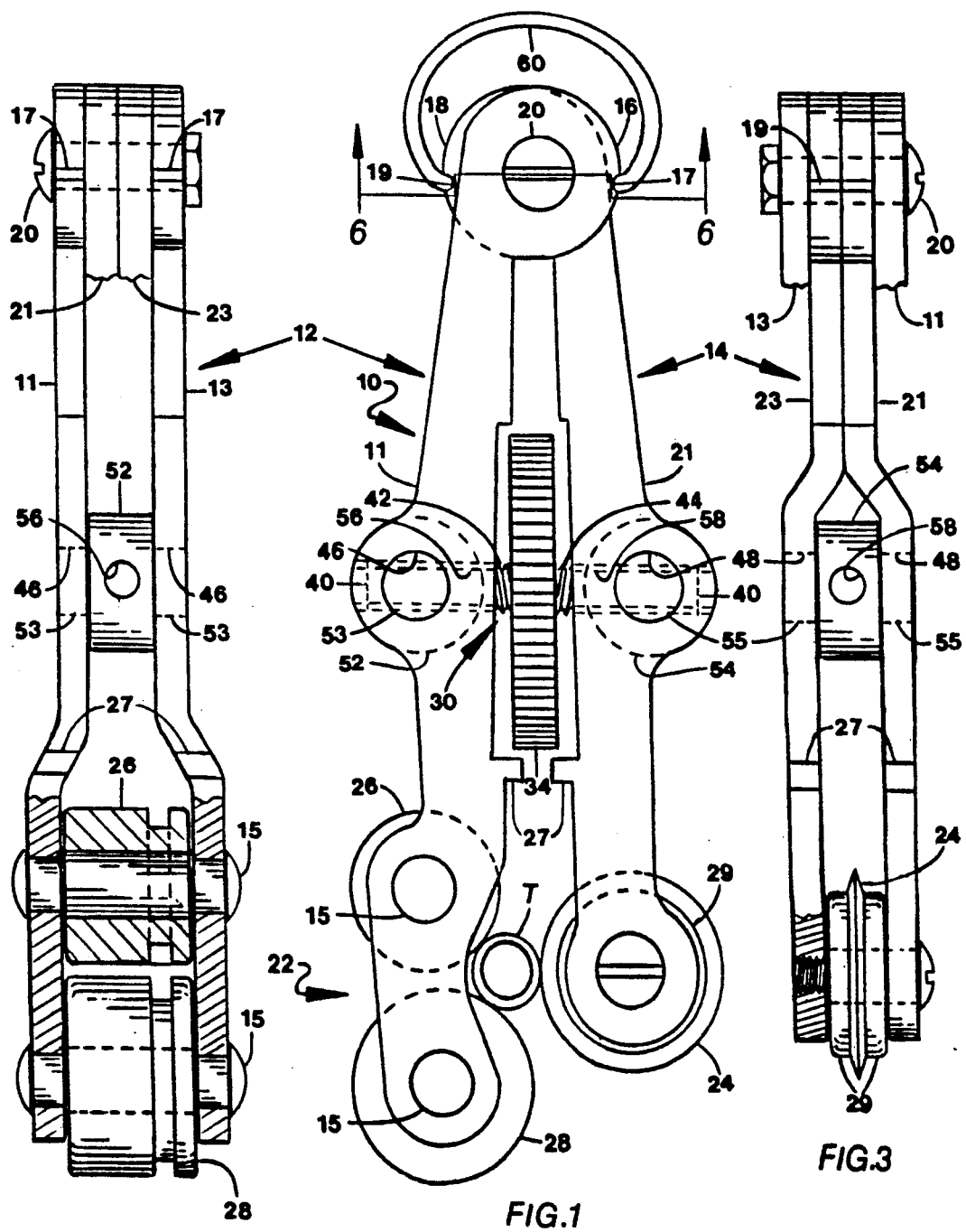
FIG. 1 is a plan view of a preferred embodiment of my invention, revealing the utilization of a pair of arms pinned together at one end, with cutter means provided at the opposite end of one arm, and roller means provided on the opposite end of the other arm, which means can be utilized in a cooperative relationship with the cutter means during the cutting of tubing by suitable manipulation of the tightening means utilized in a mid portion of the arms.
FIG. 2 is a side view of the preferred embodiment, with this figure illustrating the structural details of the arm supporting the roller means.
FIG. 3 is another side view of the preferred embodiment, with this figure depicting the configuration of the arm upon the end of which the cutting wheel is disposed.

With initial reference now to FIG. 1, I there reveal a first embodiment of my invention, involving a tubing cutter 10 utilizing a pair of arms or levers 12 and 14 of similar length. These arms have first and second ends, with the first end of the arm 12 being enlarged to form a hub 16, and the first end of arm 14 being enlarged to form a hub 18. A laterally extending, elongate hole or slot is formed in the center portion of each of the hub portions of this embodiment, enabling the upper ends of the arms 12 and 14 to be connected together in a pivotal manner by the use of a pin 20; note FIGS. 1, 5 and 7. I prefer in some instances to also refer to these first ends of the arms 12 and 14 as the pinned ends.

The second end of arm 12 has a roller means 22 whereas the second end of arm 14 has a cutting wheel 24 thereon, placed in an opposed relationship to the roller means, in a manner such that these may be used in a cooperative relationship. I prefer at times to refer to the second ends of the arms as being the free ends. As will be noted from FIGS. 1 and 2, the roller means 22 preferably involves a pair of closely spaced, separately mounted rollers 26 and 28, but I am not to be limited to this construction. As will be obvious to one skilled in the art, the relative positioning of the cutting wheel 24 with respect to the roller means 22 is such that a piece of tubing T inserted adjacent the rollers 26 and 28 can be severed at such time as the cutting wheel is being forced against the tubing contemporaneously with the application of relative rotation between the cutting wheel 24 and the tubing T; note FIG. 1.

The preferred construction of the arms or levers 12 and 14 will be evident from a study of FIGS. 2 and 3, with FIG. 2 revealing that the arm 12 is in reality constructed from a pair of substantially identical rails 11 and 13 held together in a spaced-apart relationship at the top by the pin 20, and held together in a spaced-apart relationship at the bottom by the rivets 15 or other such members upon which the rollers 26 and 28 are mounted. In other words, the two halves of the arm 12, the rails 11 and 13, reside in a suitably spaced-apart relationship, with one rail being regarded as a mirror image of the other rail.

As revealed in FIG. 3, the arm 14 may also be regarded as being constructed from a pair of substantially identical members, these being rails 21 and 23, with one rail member being the mirror image of the other. In contrast, however, to the construction of arm 12, FIG. 3 reveals that the two rails 21 and 23 constituting the arm 14 reside more closely together, flaring apart only from the center location, wherein the components associated with tightening means 30 is operatively connected, to the free ends of rails 21 and 23, where the rails are spaced apart to receive the rotatably mounted cutting wheel 24. As a result of this construction, the first end of the arm 14 is interfitted between the spaced apart upper ends of the rails 11 and 13 constituting arm 12 at the location of the pin 20. I am, quite obviously, not to be limited to this precise construction.

I may optionally use a prong or protrusion 27 on both components of the arms 12 and 14, with the protrusions on one arm arranged to be moved into contact with the protrusions on the other arm when the arms are brought together by the action of the tightening means 30. Latter means are described at some length hereinafter. The height (length) of the protrusions are such as to prevent the sharpened edge of the cutting wheel 24 coming into undesirable contact with the rollers 26 and 28.

For a particular reason I prefer to mount the cutter member 24 on a comparatively wide circular member 29, also known as a cutting wheel hub. The width of the rotary member 29 is such as to permit this member to interact with the rollers 26 and 28 at the conclusion of the procedure during which a piece of tubing T is severed by the cutting wheel 24. In other words, the cutting wheel hub 29 functions in a cooperative manner with the rollers 26 and 28 at the conclusion of the cutting effort, such that the severed tubing ends are tightly held between the hub member 29 and the rollers 26 and 28. Because of this arrangement, the ends of the tubing do not fall away at the time the tubing has been completely severed, but rather the tubing ends are held until such time as the free ends of the arms are moved apart by action of the tightening means 30. I size the cutting wheel hub 29 in such a manner that it does not interfere with the sharpened edge of the cutting wheel 24 cutting entirely through the tubing T.

In accordance with this invention, the tightening means 30 is disposed at a location intermediate the arms 12 and 14, for providing desirable motion to the arms. Depending on the direction in which it is moved in rotation, the tightening means can either cause the arms to move apart, or else cause the sharpened edge of the cutting wheel 24 to move forcefully into cutting contact with a piece of tubing T inserted between the cutting wheel 24 and the roller means 22.

The tightening means 30 preferably takes the form of a finger operated wheel 34 rotatably disposed between mid portions of the arms 12 and 14, with the periphery of this wheel positioned in such a manner as to be readily and easily engaged by the fingers of the user. When rotated in a first direction, the tightening means serves to draw the second or free ends of the arms together, such that the cutting wheel 24 is caused to make firm contact with a piece of tubing T placed between the cutting wheel and the roller means. As will be readily understood, when the tightening means 30 is rotated in a second direction, the tightening means serves to cause the free ends of the arms 12 and 14 to move apart.

It is significant to note that the finger operated wheel 34 is mounted in a mid portion of a rod 40 having oppositely threaded portions 42 and 44, with portion 42, for example, being a right hand thread and extending through a mid portion of arm 12, and the portion 44 being a left hand thread and extending through a mid portion of arm 14. Quite obviously, I am not to be limited to this particular arrangement, and as should be readily apparent, the rod 40 may be regarded as a dually threaded rod.

Inasmuch as rotation of the threaded rod portions 42 and 44 causes the arms 12 and 14 to move together or apart, depending on the direction of rotation of the wheel 34, it is quite desirable to utilize a pivotally mounted, threaded member or "floating nut" in the mid portions of each arm, to prevent either bending or binding of the dually threaded rod 40. To this end, I provide an enlarged mid portion in rails 11 and 13 of the arm 12, in each of which rails a hole 46 is located. Such hole 46 in each rail is designed to receive the pivoting internally threaded member or "floating nut" 52, latter member being best seen in FIG. 4a. Somewhat similarly, I provide an enlarged mid portion in each rail 21 and 23 of the arm 14, in each of which is located a hole 48 to receive the pivoting internally threaded member 54. Member 54 is best seen in FIG. 4b.

Figures 4A, 4B:
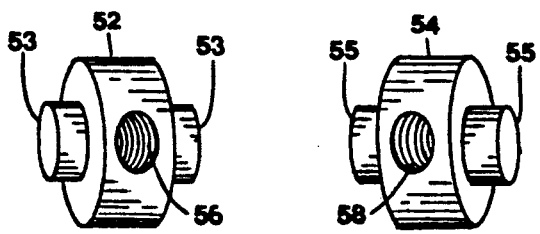
FIGS. 4a and 4b are views of the pivotally mounted, internally threaded members utilized in mid portions of the arms 12 and 14 to prevent bending or binding of the double threaded rod I use in conjunction with the tightening means.

As will be seen from a close inspection of FIG. 4a, member 52 has a pair of outwardly extending hub members 53, which are sized to be installed in a rotatable manner in the holes 46 that are located in the rail 11 and rail 13 of the arm 12. Similarly, member 54 has a pair of outwardly extending hub members 55 sized to be installed in a rotatable manner in the holes 48 that are located in the rail 21 and rail 23 of the arm 14.

The interior of member 52 is threaded at 56 to receive the threaded rod portion 42, and the interior of member 54 is threaded at 58 to receive the threaded rod portion 44. As a consequence of these relationships, the members 52 and 54 can move to a necessary orientation or rotational extent in their respective holes in the arms 12 and 14 at such time as the wheel 34 is rotated by the user, thus avoiding any tendency for binding to occur, or any bending of the double threaded rod 40 to take place.

As should now be quite apparent, rotation of the finger operated wheel 34 in one direction causes the free ends of arms 12 and 14 to move apart at a rapid rate, whereas rotation of the wheel 34 in the opposite direction causes the free ends of the arms 12 and 14 to move together, such that the sharpened peripheral edge of the cutting wheel 24 can be brought into a position in which it is in a tube cutting relationship with the tubing T. As should appear obvious, the free ends of the arms 12 and 14 can be moved more rapidly together or apart as a result of the rod 40 being a dually threaded rod, than would have been possible if my device had been designed to utilize only a single threaded rod, as utilized in the previously-mentioned Pierson and Hofmaster patents.

Quite significant to my invention is the utilization of spring means 60 serving on occasion to bias the sharpened peripheral edge of the cutting wheel 24 into firm contact with the tubing T to be cut. As will be noted from FIG. 1, the spring means 60 is of generally circular configuration, with the ends of the spring means normally residing relatively close together, in what may be regarded as an adjacent relationship. As will be seen hereinafter, the ends of the generally circular or C-shaped spring 60 are in a special relationship to the hubs 16 and 18 that are located at the upper ends of the arms 12 and 14, respectively.

Figures 5, 6, 7, 8:
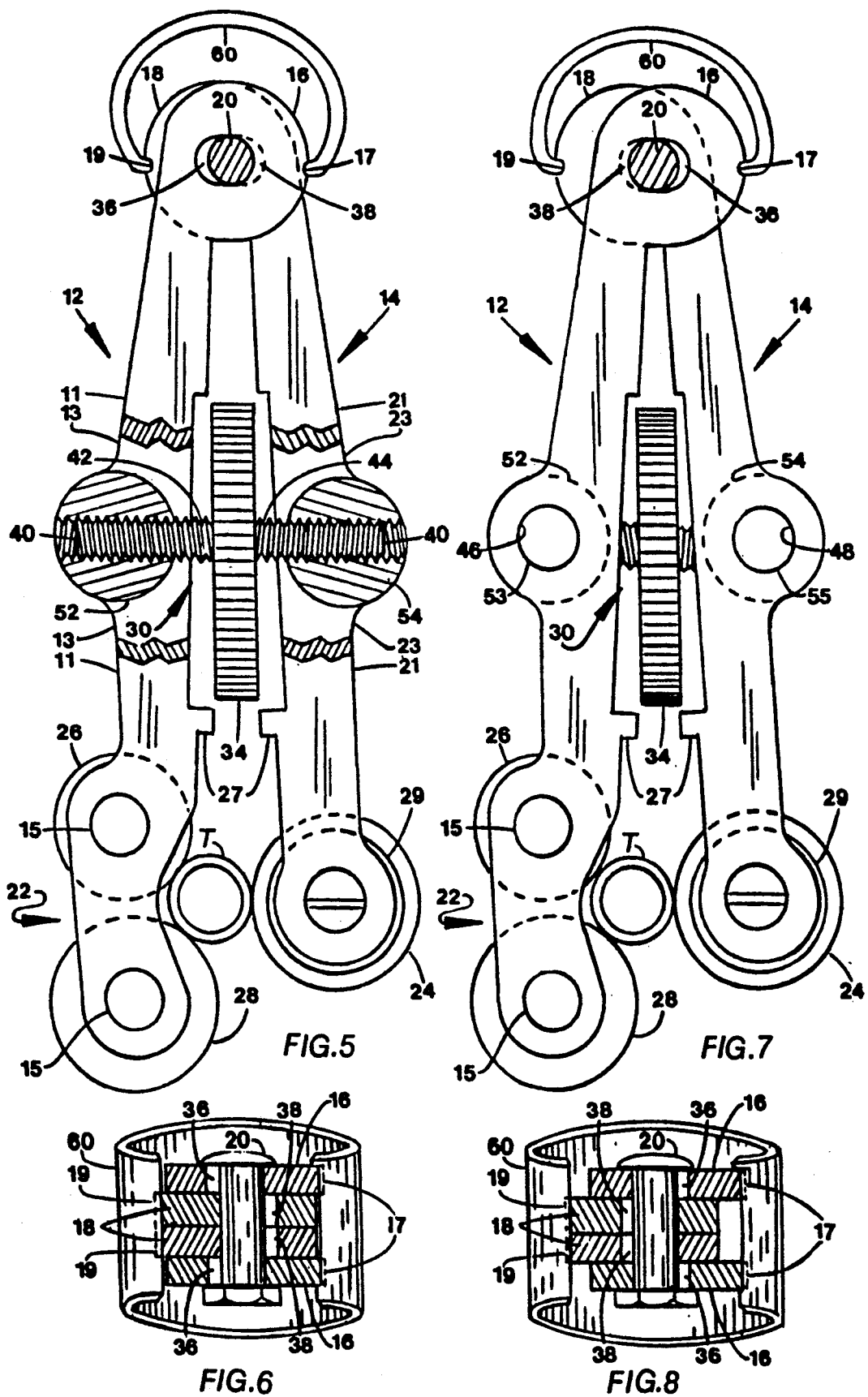
FIG. 5 is a plan view quite similar to FIG. 1, but with portions removed to reveal additional details of the utilization of the internally threaded members in this preferred embodiment of my tubing cutter, to prevent binding of the dually threaded rod.
FIG. 6 is a cross-sectional view of the hub ends of the arms of the preferred embodiment of my device, revealing the relationship of the pin to the lateral slot in the upper ends of each of the arms when the hubs are in the substantially aligned relationship revealed in FIG. 5.
FIG. 7 is the same device illustrated in FIG. 5, but here showing the relationship of the circular spring to the pinned ends of the arms when the cutter is actively being used to cut tubing, with this figure revealing the hubs of these arms having moved apart in a lateral sense as a result of the additional manipulation of the tightening means, thus causing potential energy to be stored in the spring.
FIG. 8 is a cross-sectional view similar to FIG. 6, but here showing the pin-lateral slot relationships when the hub portions of the arms have moved laterally apart in the manner indicated in FIG. 7.

With momentary reference to FIGS. 5 and 6, it can be seen that a spring-receiving notch 17 is located on one peripheral edge of hub 16, and a spring-receiving notch 19 is located on the opposite peripheral edge of hub 18. Elongate hole 36 is located in hub 16, whereas elongate hole 38 is located in hub 18. Because the hub 18 is located behind hub 16 in FIGS. 1 and 5, the elongate hole 38 is shown in dashed lines in FIG. 5. The elongate holes or slots 36 and 38 are thus provided in a laterally extending manner in the hub ends of the arms 12 and 14, respectively, at the location of the pin 20. The slot arrangement is made clear in FIGS. 5 and 7. Importantly, one end of circular or C-shaped spring 60 resides in the notch 17 located in hub 16, and the other end of spring 60 resides in the notch 19 located in hub 18, as indicated in FIG. 1. The spring 60 thus serves to bias the hubs into the generally aligned relationship depicted in FIGS. 1, 5 and 6, and to resist lateral displacement of the hubs.

It is to be understood that FIG. 6 shows in cross-section, the relationship of the pin 20 to each of the slots 36 and 38 at such time as the hubs 16 and 18 are in a generally aligned relationship, as depicted in FIGS. 1 and 5. It will be noted in FIG. 6 that the slot 36 has moved to the left with respect to the pin 20, as a result of the force of spring 60 applied at the notch 17 of hub 16, such that the pin resides in the right hand end of the slot 36. It will also be noted in FIG. 6 that the application of the force of spring 60 in notch 19 of hub 18 has caused the slot 38 to move to the right, such that the pin 20 resides in the left side of slot 38.

In contrast with the relationships depicted in FIGS. 5 and 6, FIGS. 7 and 8 show the relationship of the pin 20 to each of the slots 36 and 38 at such time as the hubs 16 and 18 have been caused to move apart, to the positions revealed in FIGS. 7 and 8, as a result of the force brought about by the manipulation of the tightening means 30, after the sharpened edge of the cutting wheel 24 has come into contact with the tubing to be cut.

With regard to the operation of this first embodiment of my device, upon the finger operated wheel 34 being rotated in a direction causing the mid portions of the arms or levers 12 and 14 to move together, the second or free ends of the arms are also drawn together, such that the sharpened edge of the cutting wheel 24 is caused to move into firm contact with the tubing T. Continued rotation of the finger operated wheel 34 brings about the cutting wheel 24 forcibly engaging the tubing T, at the location where the cutting is to take place.

This continued operation of the finger operated wheel 34 soon causes the hub ends 16 and 18 of the arms to move away from the generally aligned positions illustrated in FIGS. 1 and 5, into the laterally extended hub positions depicted in FIGS. 7 and 8. The amount of separation of the hubs 16 and 18 is of course limited by the configuration of the elongate holes or slots 36 and 38 utilized in the hub portions 16 and 18 of the two arms. As a result of this arrangement, at the time of laterally outward movement of the hub portions, the spring 60 is caused to deflect outwardly and to store a predictable amount of potential energy, which is subsequently utilized to considerable advantage, as will be later discussed.

With further reference now to FIG. 7, it is to be realized that this figure, while basically resembling FIGS. 1 and 5, nevertheless reveals the upper ends of the arms 12 and 14 at the time the cutting wheel 24 is in forceful contact with the tubing T to be cut. As will be noted, the hub portions 16 and 18 have been caused by continued rotation of wheel 34 to move away from the position shown in FIG. 5, into a widely separated relationship, thus causing a considerable amount of potential energy to be stored in the circular spring 60.

So that the circular spring 60 can effectively serve to resist the spreading apart of the upper or hub ends of the arms 12 and 14 when force is being applied to the tubing T by rotation of the cutting wheel 24, I configure the ends of the circular spring in a suitable manner. More particularly, I configure the left end of the spring 60 in such a manner that it resides in notch 19 in hub 18, and the right end of spring 60 such that it resides in notch 17 in hub 16. FIGS. 6 and 8 make these relationships quite clear. In this way, the spring 60 can effectively resist the separation of the hubs.

From comparing FIG. 5 with FIG. 7, as well as FIG. 6 with FIG. 8, it will be seen that the net result of the movement of the upper ends of the arms 12 and 14 to the spaced-apart relationship illustrated in FIGS. 7 and 8 is that potential energy will be stored in spring 60, with the spring thus serving to bias the upper ends of the arms from the cutting state depicted in FIGS. 7 and 8, back toward the initial or at rest state depicted in FIGS. 5 and 6, as the tubing is being cut.

In other words, the potential energy stored in the circular or C-shaped spring 60 in the condition illustrated in FIGS. 7 and 8 is such as to cause a continuous, highly effective bias to be applied to the cutting wheel 24, such that the cutting wheel will rapidly bring about severing of the tubing, without the user having to keep rotating the tightening wheel 34. Therefore, as the tubing cutter 10 is subsequently rotated with respect to the tubing T, the cutting wheel continues to move inwardly under the bias provided by the spring 60, with this action resulting in the severing of the tubing.

It is thus to be seen that this preferred embodiment of my invention is highly advantageous, for the storage of energy in the spring 60 is such as to cause the cutting wheel 24 to be automatically biased into an effective cutting relationship with the tubing T.

Because of the preferred configuration of the arms 12 and 14, with the tightening means being located approximately in the mid point of the arms 12 and 14, for every pound of force applied by the cutting wheel 24 to the tubing T, there will be the same number of pounds serving to push the ends of the circular spring 60 apart, thus causing a considerable amount of potential energy to be stored in the spring.

Another important advantage of my invention is brought about by the relationship of the cutting wheel hub 29 to the rollers 26 and 28. At such time as the tubing is severed, the tubing components continue to be grasped between the cutting wheel hub 29 and the roller means 22, such that the two tubing end portions do not fall away. Rather, the severed ends are released upon the tightening wheel being moved in the direction causing the free ends of the arms to move apart.

The circumferential slots visible in rollers 26 and 28 in FIG. 2 are placed, in accordance with conventional practice, for the accommodation of a flanged tubing end needing to be cut off.

An additional advantage of this invention involves my use of the doubly threaded shaft 40 that serves to move the cutting wheel 24 more rapidly toward or more rapidly away from the roller means 22 than is the case when the rod is only singly threaded, as typified by the tubing cutters of the prior art.

It is to be understood that I am not to be limited to an arrangement in which an elongate slot is utilized in the hub portion of both of the arms 12 and 14, for in some instances, it is only necessary to utilize an elongate slot in the hub portion of one of the arms.

Figure 9:
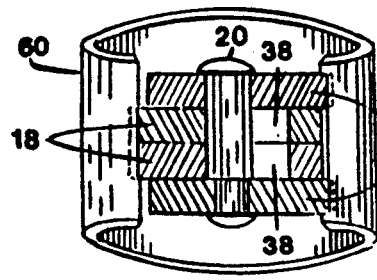
FIG. 9 is a cross-sectional view showing the pin-lateral slot relationship when only one arm is equipped with a lateral slot, and the hub members of the arms are disposed in a substantially aligned relationship.

With reference to FIG. 9, it is to be seen that I have provided a cross-sectional view of an embodiment in which an elongate, lateral slot is utilized in only one hub member. The placement of the single slot is entirely optional, but in this particular instance, I have illustrated slot 38, located in hub 18 of arm 14. In FIG. 9, an at-rest condition is represented, in which the hubs are in an aligned relationship brought about by the functioning of the spring 60.

Figure 10:
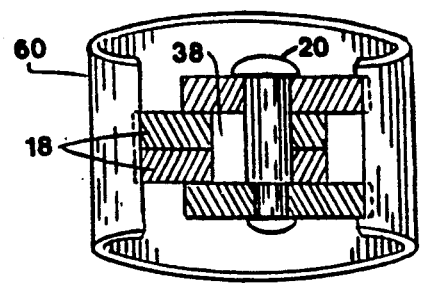
FIG. 10 is a cross-sectional view much like FIG. 9, but here showing the pin-lateral slot relationship when the hub members of the arms have moved apart in a lateral sense as a result of additional manipulation of the tightening means.

Turning to FIG. 10, it will be seen in this view relatable to FIG. 9, that I have depicted the hubs in a separated relationship, brought about by the tightening wheel 34 having been rotated for an additional amount after the sharpened edge of the circular cutter 24 has been brought into contact with the tubing T. This of course causes the hubs of the arms to move laterally apart, against the bias of spring 60, with this lateral movement being able to take place for an extent permitted by the single lateral slot 38. As the tubing cutter is thereafter rotated with respect to the tubing, the cutting wheel continues to move inwardly under the bias provided by the spring 60, with this action resulting in a highly effective severing of the tubing.

Figure 11:
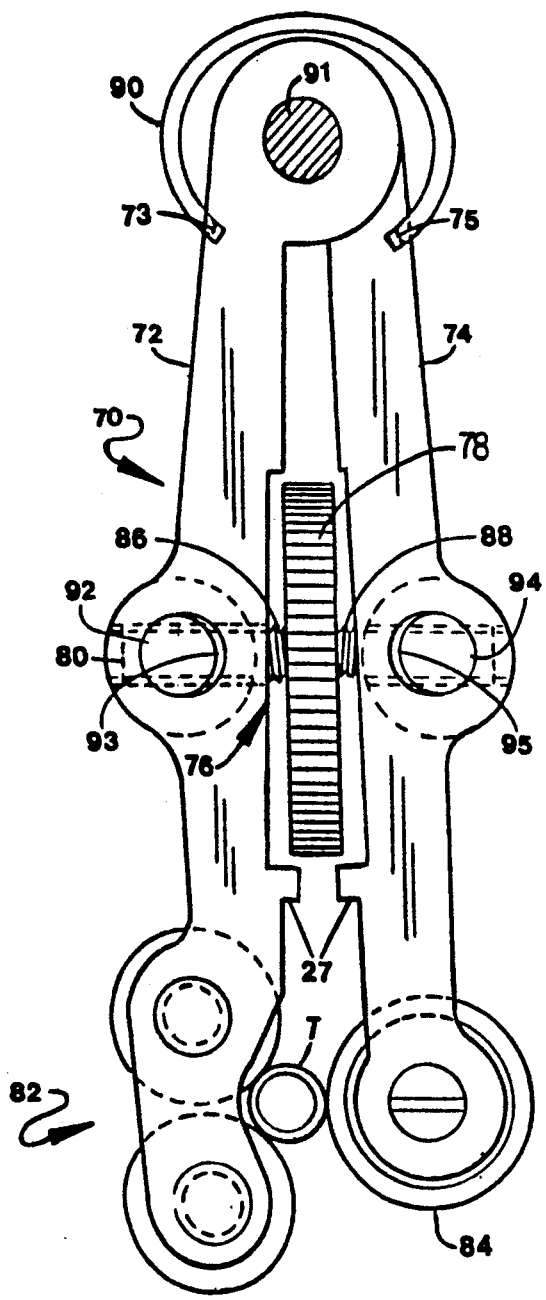
FIG. 11 is an embodiment of my tubing cutter in which a circular spring is utilized, but wherein no slot permitting lateral motion of the hubs of the arms is employed.

Turning to a consideration of a second embodiment of my invention, it will be seen in FIG. 11 that I have depicted an embodiment 70 in which I am able to obtain the advantages of a tightening means 76 involving the use of a finger-operated tightening wheel 78 mounted upon a dually threaded rod 80. The oppositely threaded ends of the rod 80 are in operative engagement with threaded components located in mid portions of the arms 72 and 74, such that by rotation of the tightening wheel 78 in the desired direction, the free ends of the arms 72 and 74 can be caused to move together or apart. The first ends of the arms 72 and 74 are held together in a hinged relationship by a pivot pin 91, with the ends of an encircling spring 90 of generally circular configuration being mounted in operative contact with the upper ends of arms 72 and 74. I utilize a notch 73 in arm 72, and a notch 75 in arm 74, in which the ends of the spring 90 are mounted. The ends of the spring 90 being in contact with the arms 72 and 74 at locations spaced away from the pivot pin 91, toward the free ends of the arms, the spring 90 serves to bias the free ends of the arms together.

As in the primary embodiment, in the embodiment depicted in FIG. 11 I employ a roller means 82 located on the free end of arm 72, which roller means is utilized in concert with a cutting wheel 84 utilized on the free end of arm 74. By appropriate tightening of the wheel 78, the sharpened edge of the cutter means 84 can be brought into tight engagement with tubing T placed between the roller means 82 and the cutter wheel 84. The spring 90 serves to cause the sharpened edge of the cutting wheel 84 to be biased into firm, cutting contact with tubing placed between the cutting wheel 84 and the roller means 82. At this time the rotation of the device 70 about the tubing causes the cutting wheel 84 to penetrate the tubing and bring about the severing thereof, with the spring 90 serving to keep the cutting wheel in continuous contact with the tubing to be cut.

It is to be noted that the threaded left side 86 of the rod 80 does not directly engage the arm 72, but rather threadedly engages a pivotally-mounted, internally threaded member 92 disposed in a hole 93 that is somewhat oversize in the lateral direction, which hole or slot is disposed in a mid portion of the arm 72. In a similar manner, the right side 88 of threaded rod 80 threadedly engages a pivotally-mounted, internally threaded member 94 located in a hole 95 disposed in a mid portion of the arm 74, that is oversize in a lateral direction. As discussed in conjunction with the primary embodiment, by having the dually threaded rod arranged to engage pivotally-mounted, internally threaded members disposed in the arms of the cutter, any tendency of the threaded rod 80 to bend or to bind in the arms at the time of rotation of the tightening wheel 78 is avoided inasmuch as the components 92 and 94 can rotate to an extent necessary to permit the dually threaded rod to rotate easily on its axis.

The somewhat oversize holes 93 and 95 are deliberately elongate in the lateral direction, in order not to inhibit the effective utilization of the circular spring 90. By virtue of the rod 80 having oppositely threaded ends, upon the tightening wheel being rotated in one direction, the pair of pivotally-mounted, internally threaded members are caused to travel either laterally outwardly or laterally inwardly in their respective oversize holes.

As is obvious, at the time the cutting wheel 84 is to be moved away from the tubing T, the tightening wheel 78 is rotated in a manner to cause the internally threaded members 92 and 94 to move outwardly, so as to leave space on the inward side of the slots or oversize holes 93 and 95; note FIG. 11 in this regard.

On the other hand, when the cutting wheel 84 is to be brought into cutting contact with the tubing T, it is necessary for the tightening wheel 78 to be rotated in the direction causing the internally threaded members 92 and 94 to move inwardly, so as to eliminate any space from the inward portion of the slots 93 and 95. Increased rotation of the tightening wheel 78 causes the tubing to be severed as a result of rotation of the device 70 with respect to the tubing T.

The use of the lateral slots 93 and 95 effectively prevents the dually threaded rod from inhibiting the efforts of the circular spring 90 keeping the cutter wheel 84 continuously biased into firm, cutting contact with the tubing T. If the members 92 and 94 were relatively tightly mounted in circular holes in the arms 72 and 74, the spring could not continue to apply a bias after a certain point was passed in the cutting of the tubing, but by having the members 92 and 94 comparatively loosely contained in the arms, sufficient slack is permitted as to make a continuous spring bias possible, and a more advantageous cutting action applied to the tubing.

It is not mandatory that an elongate slot be used in both of the arms 72 and 74, for in some instances I can utilize a single elongate slot, located in only one of the arms.

Figure 12:
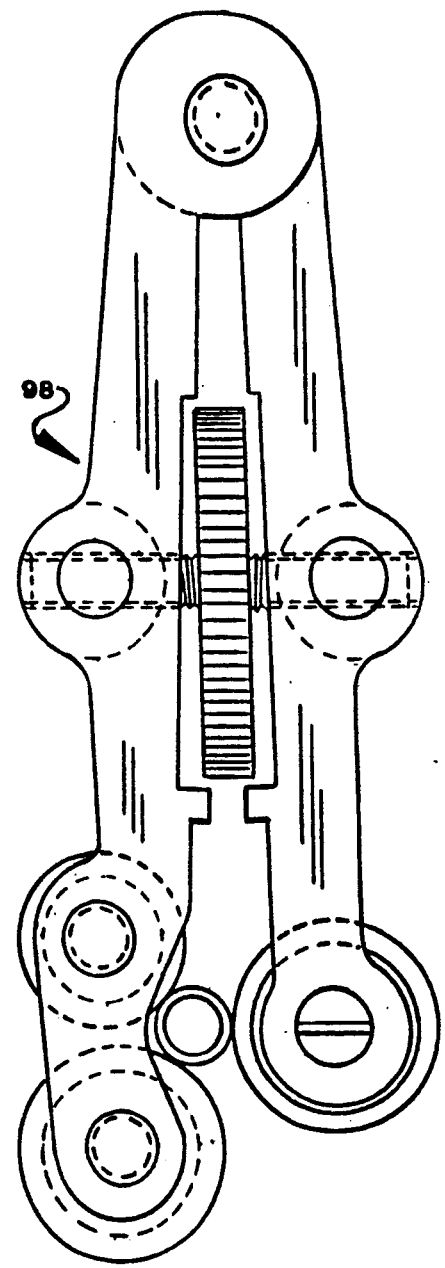
FIG. 12 is an embodiment of my tubing cutter in which no utilization is made of a spring, nor is any slot utilized as will permit lateral hub motion.

In FIG. 12 I have depicted what may be regarded as an "economy" version of my tubing cutter, for in this embodiment, no spring bias is utilized for causing the cutting wheel to maintain firm contact with the tubing to be cut, nor is any elongate slot employed in the vicinity of the pin in order to hold the two arms together in the desired hinged relationship. This embodiment, known as embodiment 98, possesses all of the other attributes associated with the previously-described embodiments.

I claim:

1. A tubing cutter comprising a pair of arms pivotally connected together adjacent one end, with the opposite ends of said arms free, the opposite end of one of said arms having thereon a rotatably mounted cutting wheel and the opposite end of the other of said arms having roller means thereon, having at least one roller mounted in opposed operative relationship to said cutting wheel, and tightening means for drawing said free ends together, so as to force said cutting wheel into cutting contact with a piece of tubing placed between said cutting wheel and said roller means, whereby upon relative rotation occurring between said cutting wheel and the tubing, the severing of the tubing can be brought about, said tightening means comprising a finger operated wheel rotatably disposed between mid portions of said arms and positioned to be engaged by the fingers of a user, said finger operated wheel being mounted in a mid portion of a rod having oppositely threaded portions, with one threaded rod portion operably engaging one of said arms, and the oppositely threaded rod portion operably engaging the other of said arms, said arms being connected together by a pin, disposed in a laterally extending slot provided at the pivot end of one of said arms, and spring bias means serving to hold the pivot ends of said arms together, in a generally aligned relationship, said finger operated wheel, upon being operated in a direction causing the mid portions of said arms to come together, causing said free ends of said arms to move together, and in doing so, to cause said cutting wheel to forcibly engage tubing to be cut, that has been placed between said cutting wheel and said roller means, with continued operation of said finger operated wheel causing said pivot ends of said arms to move apart, against the bias provided by said spring bias means, to the extent permitted by said laterally extending slot, with said spring bias means thereafter providing a force directly serving to aid the cutting of the tubing.

2. The tubing cutter as recited in claim 1 in which a laterally extending slot is provided in the pivot end of each of said arms.

3. The tubing cutter as recited in claim 1 in which said cutting wheel is mounted on a relatively wide hub, said hub interacting with said roller means at the time the tubing is severed, to hold the tubing ends, and prevent them from dropping away.

4. A tubing cutter comprising a pair of arms of similar length having first and second ends, with said first ends of said arms being connected together in a pivotal manner by a pin, the second end of one of said arms having a rotatably mounted cutting wheel thereon, and the second end of the other of said arms having roller means mounted thereon, in opposed, operative relation to said cutting wheel, and tightening means located in a mid portion of said arms for enabling said second ends to be forcefully drawn together, whereby a piece of tubing placed between said cutting wheel and said roller means can be severed by relative rotation occurring between said cutting wheel and the tubing, a laterally extending slot provided in the first end of at least one of said arms, at the location of said pin, and spring bias means serving to hold said first ends together, in a generally aligned relationship, said finger operated wheel, upon being operated in a direction causing the mid portions of said arms to come together, causing said second ends of said arms move together, and in doing so, to cause said cutting wheel to forcibly engage tubing to be cut, that has been placed between said cutting wheel and said roller means, with continued operation of said finger operated wheel causing said first ends of said arms to move apart, against the bias provided by said spring bias means, to the extent permitted by said laterally extending slot, with said spring bias means thereafter providing a force serving to aid the cutting of the tubing.

5. The tubing cutter as recited in claim 4 in which a laterally extending slot is provided in the first end of both of said arms.

6. The tubing cutter as recited in claim 4 in which said cutting wheel is mounted on a relatively wide hub, said hub interacting with said roller means at the time the tubing is severed, to hold the tubing ends, and prevent them from dropping away.

7. A tubing cutter comprising a pair of arms of similar length having first and second ends, with said first ends of said arms being connected together in a pivotal manner by a pin, the second end of one of said arms having a rotatably mounted cutting wheel thereon, and the second end of the other of said arms having roller means mounted thereon, in opposed operative relation to said cutting wheel, and tightening means located in a mid portion of said arms for enabling said second ends to be forcefully drawn together, such that a piece of tubing placed between said cutting wheel and said roller means can be severed by relative rotation occurring between said cutting wheel and the tubing, said tightening means comprising a finger operated wheel rotatably disposed between mid portions of said arms and positioned to be engaged by the fingers of a user, said finger operated wheel being mounted in a mid portion of a rod having oppositely threaded portions, with one threaded rod portion operably engaging one of said arms, and the oppositely threaded rod portion operably engaging the other of said arms, whereby rotation of said finger operated wheel in one direction causes the second ends of the arms to move apart, and rotation of said finger operated wheel in the opposite direction causes the second ends of the arms to move together, such that said cutting wheel can be forcefully moved into a relationship with the tubing such that the tubing can be severed during the occurrence of relative rotation between said cutting wheel and the tubing, a laterally extending slot being provided in the first end of at least one of said arms, at the location of said pin, and spring bias means serving to hold said first ends together, in a generally aligned relationship, said finger operated wheel, upon being operated in a direction causing the mid portions of said arms to come together, causing said second ends of said arms move together, and in doing so, to cause said cutting wheel to forcibly engage tubing to be cut, that has been placed between said cutting wheel and said roller means, with continued operation of said finger operated wheel causing said first ends of said arms to move apart, against the bias provided by said spring bias means, to the extent permitted by said laterally extending slot, with said spring bias means thereafter providing a force serving to aid the cutting of the tubing.

8. The tubing cutter as recited in claim 7 in which a laterally extending slot is provided in the first end of each of said arms.

9. The tubing cutter as recited in claim 7 in which said cutting wheel is mounted on a relatively wide hub, said hub interacting with said roller means at the time the tubing is severed, to hold the tubing ends, and prevent them from dropping away.

10. A tubing cutter comprising a pair of arms pivotally connected together adjacent one end, with the opposite ends of said arms free, the opposite end of one of said arms having thereon a rotatably mounted cutting wheel and the opposite end of the other of said arms having roller means thereon, having at least one roller mounted in opposed operative relationship to said cutting wheel, spring bias means provided at a location where said pair of arms are pivotally connected together, said spring bias means serving, on occasion, to bias said cutting wheel into firm contact with the tubing to be cut, and tightening means for drawing said free ends together, so as to force said cutting wheel into cutting contact with a piece of tubing placed between said cutting wheel and said roller means, whereby upon relative rotation occurring between said cutting wheel and the tubing, the severing of the tubing can be brought about, said tightening means comprising a finger operated wheel rotatably disposed between mid portions of said arms and positioned to be engaged by the fingers of a user, said finger operated wheel being mounted in a mid portion of a rod having oppositely threaded portions, with one threaded rod portion operably engaging one of said arms, and the oppositely threaded rod portion operably engaging the other of said arms, and an elongate, laterally-extending hole provided at a location of the pivotal connection of said arms, enabling relative arm motion to take place during a tightening effort applied by said tightening means, causing storage of energy in said spring bias means and thus biasing said cutting wheel into continuous contact with the tubing.

11. A tubing cutter comprising a pair of arms of similar length having first and second ends, with said first ends of said arms being connected together in a pivotal manner by a pin, the second end of one of said arms having a rotatably mounted cutting wheel thereon, and the second end of the other of said arms having roller means mounted thereon, in opposed, operative relation to said cutting wheel, and spring bias means provided at a location adjacent said pin, said spring bias means serving, on occasion, to bias said cutting wheel into firm contact with tubing to be cut, and tightening means pivotally connected to a mid portion of said arms for enabling said second ends to be forcefully drawn together, whereby a piece of tubing placed between said cutting wheel and said roller means can be severed by relative rotation occurring between said cutting wheel and the tubing, said tightening means comprising a finger operated wheel rotatably disposed between mid portions of said arms and positioned to be engaged by the fingers of a user, said finger operated wheel being mounted in a mid portion of a rod having oppositely threaded portions, with one threaded rod portion operably engaging one of said arms, and the oppositely threaded rod portion operably engaging the other of said arms, and at least one elongate, laterally-extending hole provided at a location of the pivotal connection, therefore enabling relative arm motion to take place during a tightening effort applied by said tightening means, causing storage of energy in said spring bias means and thus biasing said cutting wheel into continuous contact with the tubing.

12. A tubing cutter comprising a pair of arms of similar length having first and second ends, with said first ends of said arms being connected together in a pivotal manner by a pin, the second end of one of said arms having a rotatably mounted cutting wheel thereon, and the second end of the other of said arms having roller means mounted thereon, in opposed operative relation to said cutting wheel, spring bias means provided at a location adjacent said pin, said spring bias means serving, on occasion, to bias said cutting wheel into firm contact with tubing to be cut, and tightening means located in a mid portion of said arms for enabling said second ends to be forcefully drawn together, such that a piece of tubing placed between said cutting wheel and said roller means can be severed by relative rotation occurring between said cutting wheel and the tubing, said tightening means comprising a finger operated wheel pivotally connected in a rotatable manner between mid portions of said arms and positioned to be engaged by the fingers of a user, said finger operated wheel being mounted in a mid portion of a rod having oppositely threaded portions, with one threaded rod portion pivotally connected to one of said arms, and the oppositely threaded rod portion pivotally connected to the other of said arms, whereby rotation of said finger operated wheel in one direction causes the second ends of the arms to move apart, and rotation of said finger operated wheel in the opposite direction causes the second ends of the arms to move together, such that said cutting wheel can be forcefully moved into a relationship with the tubing such that the tubing can be severed during the occurrence of relative rotation between said cutting wheel and the tubing, and at least one elongate, laterally-extending hole provided at the location of at least one of the pivotal connections, enabling relative arm motion to take place during a tightening effort applied by said tightening means, as will permit the release of stored energy in said spring bias means and thus biasing said cutting wheel into continuous contact with the tubing.

13. The tuning cutter as recited in claim 12 in which an elongate, laterally-extending hole is provided in a mid portion in each of said arms, an internally threaded member disposed in each of said elongate, laterally-extending holes, with each of said threaded rod portions of said finger operated wheel threadedly engaging the internally threaded member disposed in the mid portion of a respective one of said arms.

* * * * *